(12) United States Patent
Mizrahi

(10) Patent No.: US 6,562,304 B1
(45) Date of Patent: May 13, 2003

(54) SCRUBBER FOR THE TREATMENT OF FLUE GASES

(75) Inventor: Joseph Mizrahi, Haifa (IL)

(73) Assignee: Clue AS, Bergen (NO)

( * ) Notice: Subject to any disclaimer, the term of this patent is extended or adjusted under 35 U.S.C. 154(b) by 0 days.

(21) Appl. No.: 09/530,011
(22) PCT Filed: Oct. 19, 1998
(86) PCT No.: PCT/IL98/00510
§ 371 (c)(1), (2), (4) Date: Aug. 7, 2000
(87) PCT Pub. No.: WO99/20371
PCT Pub. Date: Apr. 29, 1999

(30) Foreign Application Priority Data

Oct. 22, 1997 (IL) .................................................. 122015

(51) Int. Cl.$^7$ ............................................... B01D 50/00
(52) U.S. Cl. ........................ 422/171; 422/168; 422/169; 422/170; 96/271; 96/361
(58) Field of Search ................................ 422/168, 169, 422/176, 170, 171, 173; 95/235, 232, 217; 96/361–365, 271, 300, 297, 356, 358

(56) References Cited

U.S. PATENT DOCUMENTS

| | | | | |
|---|---|---|---|---|
| 3,522,000 A | * | 7/1970 | Kinney ........................ 422/169 |
| 3,785,127 A | * | 1/1974 | Mare ............................ 55/440 |
| 3,948,608 A | * | 4/1976 | Weir, Jr. ...................... 422/170 |
| 4,343,771 A | * | 8/1982 | Edwards et al. ............. 422/170 |
| 5,403,568 A | * | 4/1995 | Stowe, Jr. .............. 423/243.08 |

* cited by examiner

Primary Examiner—Hien Tran
(74) Attorney, Agent, or Firm—Fulbright & Jaworski, LLP

(57) ABSTRACT

The invention relates to a novel and most efficient scrubber for the treatment of flue gases from power generation plants or from chemical plants, in order to absorb objectionable impurities, such as $SO_2$, $SO_3$, HCl, nitrous oxides, into a water-based solution, in which solids are not substantially precipitated. The novel scrubber comprises: a horizontal chamber, with a basis rectangular vertical cross section, divided along the horizontal axis into a number of compartments by vertically-draining demisters covering the whole vertical cross section; a shallow liquid-collecting sump in each compartment, which can be sloped in any convenient direction; a pump which distributes the liquid from each such sump, at a controlled flow-rate to a series of spray nozzles in the same compartment, generating 3–5 vertical "falling curtains" perpendicularly to the gas flow and covering the whole vertical cross section, while the liquid drops fall back into the sump.

7 Claims, 3 Drawing Sheets

SCRUBBER FOR THE TREATMENT OF FLUE GASES

The present invention relates generally to a novel and most efficient scrubber for the treatment of flue gases from power generation plants or from chemical plants, in order to absorb objectionable impurities, such as $SO_2$, $SO_3$, HCl, nitrous oxides, into, a water-based solution, in which solids are not substantially precipitated.

BACKGROUND OF THE INVENTION

Flue gases from power generation plants and boiler houses contain variable amounts of $SO_2$, $SO_3$, nitrous oxides or acids and similar impurities of acidic nature, deriving from the fuel burned Similarly, exit gases from many chemical plants contain such compounds or similar impurities. These impurities are known to be hazardous to the environment and it is generally required by statutory regulations to treat these gases before their discharge to the atmosphere, in order to reduce, as far as possible, the content of these objectionable impurities. In some cases, $CO_2$ is also included in this category.

There are many processes and methods actually used, generally grouped under the name of wet Flue Gases Desulfurization (FGD), all of which consisting of contacting the flue gases with an aqueous solution or slurry, having a basic reaction, in order to absorb the objectionable impurities. These processes and methods could be subdivided into:

a) alkaline slurry containing limestone or burned lime, generally resulting in a slurry of calcium sulfite and/or sulfate crystals and a contaminated aqueous solution bleed b) alkaline solution of hydroxides of either alkali (potassium, sodium), alkaline earth (calcium, magnesium) or ammonium, resulting in solutions of sulfite and/or sulfate salts in which solids are not substantially precipitated, and c) dilute saline solutions, such as sea water, used on a once-through basis.

An intimate contact between the flue gases and the slurry or solution is required in order to absorb the acidic impurities into the aqueous solutions and react them with the basic-reacting component. Such contact is carried-out in specially-designed equipment, termed contactor, absorber or scrubber. The term scrubber will be used in this application, although the other terms are included in the scope of the present invention.

Generally, the industrial scrubbers used consist of vertical columns, in which the slurry or solution is flowing downwards and the gases may flow either downwards (that is co-current contact) or upwards (that is counter-current contact). In smaller operations in the past, packed columns and/or tray columns were used but counter-current spray-columns are now used more extensively. Although the packed or tray columns give a more efficient contact than spray columns, they cannot operate with concentrated slurry, are much more expensive to install and create a larger pressure drop on the gas flow.

The design of industrial scrubbers must accommodate contradictory requirements; on one hand to adjust the liquid/gas volumetric flow-rates to a workable range, by a significant internal liquid recycle, and on the other hand to maintain a very small forwards net liquid flow, needed to provide a concentrated solution for further processing.

A counter-current spray column generally consists (see illustration in FIG. 1) in an empty vertical cylindrical chamber with the following process steps:

a) A solution or slurry is pumped under pressure and sprayed in the upper part, by means of a large number of spray nozzles, organized in a manifold system covering the whole horizontal cross section of the column, at one or several different heights.

b) The resulting drops flow downwards and are collected into a sump at the lower end of the column; a large part of the drops impinge with one another in their flight and coalesces into larger drops.

c) The gases are introduced from a horizontal duct at one side of the column, and their flow-lines must perform a 90° C. turn, before they can flow vertically upwards, against the flow of drops; as a result, uneven velocities and dead-zones are created.

d) The vertical contact results in both partial absorption and temperature equilibration, as the gases can be cooled by water evaporation; sometimes small drops may be entrained upwards by the upraising gas flow.

e) Above the upper row of spray nozzles, the gases are usually demisted from entrained droplets before being discharged.

f) The largest part of the solution or slurry from the sump is pumped back to the sprayed nozzles and fresh solution or slurry is added to this stream; as a result, a bleed stream of solution or slurry is removed continuously from the sump and sent to a further processing step, which is an integral and necessary part of any FGD process.

This generally accepted configuration of spray-column scrubber has been used in a large number of FGD plants producing calcium sulfite or sulfate slurries, since it is simple to conceive and construct, and can be operated with more or less concentrated slurries. It has however a number of inherent deficiencies which impair on its effective applications in other processes typical examples are:

a) The scrubber operates as one single equilibrium stage, at most, due to the facts that the large liquid recirculation rate is from end-to-start and that the concentration changes in the liquid cycle are relatively small. Any process requiring more than one equilibrium stage (in order to obtain a lower residual concentration of objectionable impurities in the exit gases) cannot be performed in a single spray column scrubber. The term counter-current is misleading here, since it refers only to the hydrodynamic flows but not to the process results. In addition, in order to approach a one-stage equilibrium and to provide for the necessary mass transfer driving force, the circulation load must be increased considerably and excess reactants must be maintained, leading to waste of unused reactant in the bleed stream.

b) Relatively low gas flow vertical velocities, generally less than 1 to 3 meters/second, are used to limit back-mixing and entrainment of liquid/slurry drops, which would be counterproductive to the absorption process. The lower gas velocities, in connection with the large volumetric flows of flue gases, generally result in industrial columns with very large diameters.

c) These large diameters are combined with the significant heights required for the different duties, (i.e. collecting sump, gas turning section, contacting section, separation and demisting) result into very bulky columns with costly construction and foundations problems.

d) These significant heights also increase the pumping energy consumed for slurry recirculation, using more expensive high pressure pumps.

The object of the present invention is generally to provide a novel and more efficient scrubber, which avoids, or at least reduces significantly, the above mentioned inherent deficiencies of the spray column scrubber and is particularly suited for FGD processes aiming at high elimination efficiency and using a water-based solution in which solids are not substantially precipitated.

Within this class of FGD processes, those using ammonia as the basic reactant are of special interest, since these produce a concentrated solution of ammonium sulfate which can be processed profitably into a variety of fertilizers.

SUMMARY OF THE INVENTION

The novel scrubber comprises (see illustration in FIG. 2) a horizontal chamber with a rectangular cross section, divided along the horizontal axis into a number of compartments by demisters. The gases enter through a duct at one end and exit through a duct at the other end. The "picket-fence" demisters between the compartments assure that gas flow lines are spread evenly over the whole cross section area and that entrainment of drops between compartments is kept to a minimum. If needed for layout constraints or convenience, the horizontal axis can be bent or turned in any direction, or even arranged as a horse-shoe complete turn-around.

In each compartment, there is a liquid-collecting sump and a centrifugal pump (except possibly for the last one) which distribute the liquid to a series of 3–5 "failing curtains" of spray nozzles, perpendicularly to the gas flow. The liquid drops return to the sump. The liquid sumps are arranged so that excess liquid from one sump overflows into the previous one, without possibility of liquid back-flow. Water or a process solution is introduced in the last compartment. Solutions of increasing concentrations are obtained in the overflows from the different compartments, and a concentrated solution is obtained from the first compartment's sump, which overflows into a collecting tank. The base reactant can be introduced in any one, or several compartments, as more convenient for the process considered. It could also be sprayed into the hot flue gases entering the scrubber.

The gas flow is contacted thoroughly in the series of compartments with liquids with different controlled concentrations establishing a true multi-stages, i.e., a number of compartments, counter-current process configuration where directions for gas flow and liquid flow are different as described above. In last compartment may serve also for final demisting before the gases exit.

The novel scrubber avoids, or at least reduces significantly the inherent deficiencies of the spray column scrubber listed above, in view of the following:

a) It allows a true multi-stages counter-current process configuration, instead of a single stage, by separating between the internal recycle needed to adjust the liquid/gas volumetric flow-rates to a workable range, and the very small forwards net liquid flow needed to provide a concentrated solution for further processing. This results into a smaller contact volume is required, due to the higher mass transfer driving forces, and/or a more concentrated bleed solution is obtained for further processing, and a lower residual concentration of objectionable impurities remains in the outgoing gases b) It allows working with much higher gas velocities than in a spray column, since the gas is flowing perpendicularly to the drops gravity force, so that the drops trajectory can only be moved sideways, until they impinge with the vertical "picket-fence" demisters. This results into much smaller cross section areas and "radial" dimensions.

c) The horizontal configuration allows for light-weight construction, at any convenient height, and easily adaptable to industrial layouts, as it can be bent and installed on the roof or at roof level. The sumps needed are very shallow and could be slopped in any direction, as convenient.

d) The pumping head needed is lower, by at least a factor of five, thus the energy cost is much reduced and the pumps need not be high pressure models.

e) The separation of the solutions in the different compartments makes possible the use of feed-back control on the input of reactants for efficient adjustment to fluctuations in operating conditions, and consequently, minimizing the usage and waste of such reactants.

DETAILED DESCRIPTION OF THE INVENTION AND DRAWINGS

The novel scrubber design generally consists of a horizontal empty chamber with a rectangular cross section, divided along the horizontal axis into a number of compartments, by "picket-fence" demisters. The flue gases enter at one end, pass horizontally thorough all the compartments and exit in a duct at the other end. The last compartment serves for final demisting before gases exit. The compartments are indexed in the direction of the gas flow.

Figure 3:
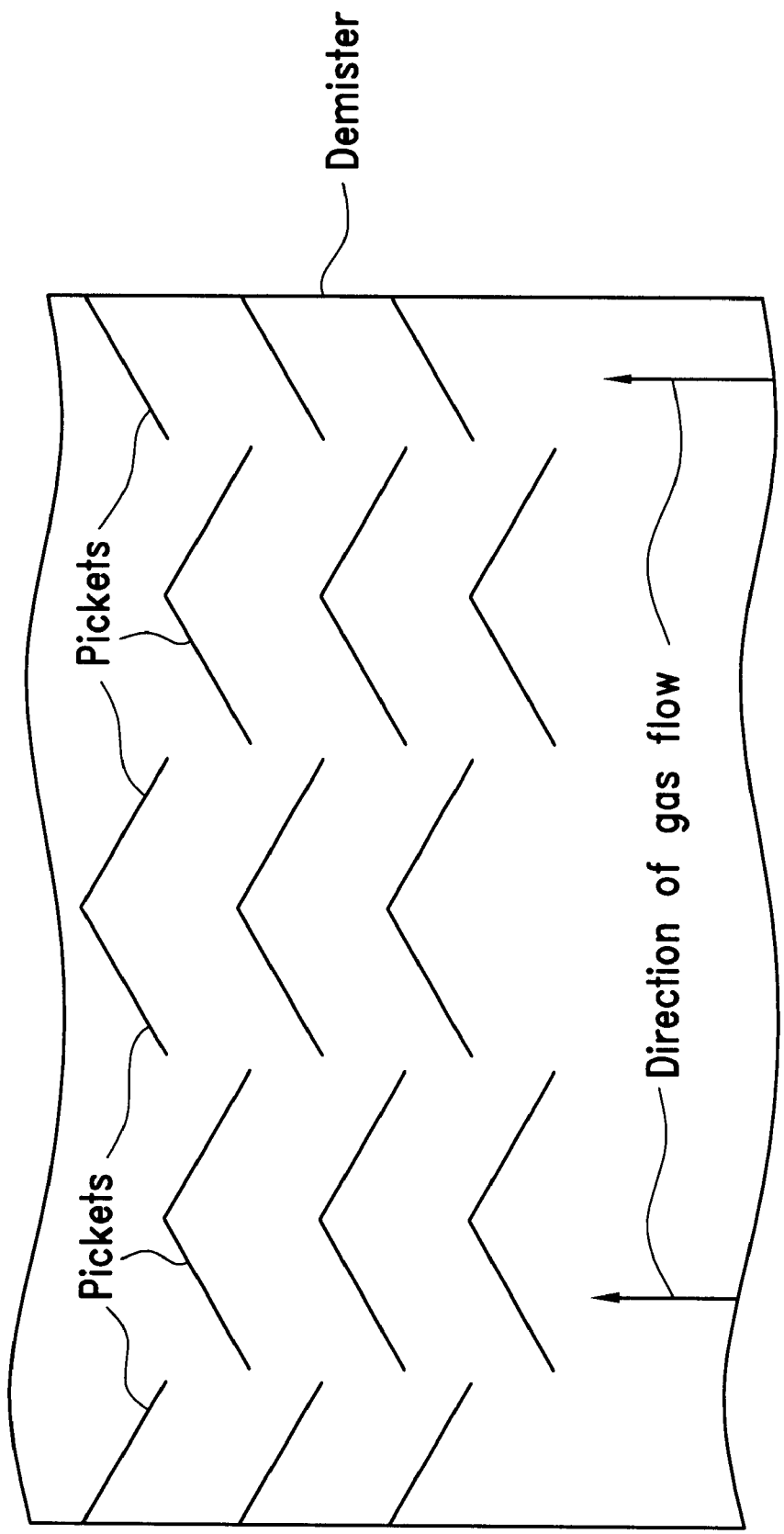
FIG. 3 represents a cross section through a picket-fence demister.

These "picket-fence" demisters consist in 3, 4 or 5 rows of straight pickets reaching from top to bottom of the chamber, each picket made from a sheet bent at an angle opened against the flow direction, as shown in FIG. 3 (cross section). The function of the "picket-fence" demisters is to spread the gas flow lines evenly over the whole cross section area and to reduce drops entrainment between compartments to a minimum.

Although picket-fence demisters are efficient and have a low-pressure drop, other types of demisters can also be used, such as perforated plates, meshed wires or bars, louvers, and so like.

Figure 1:
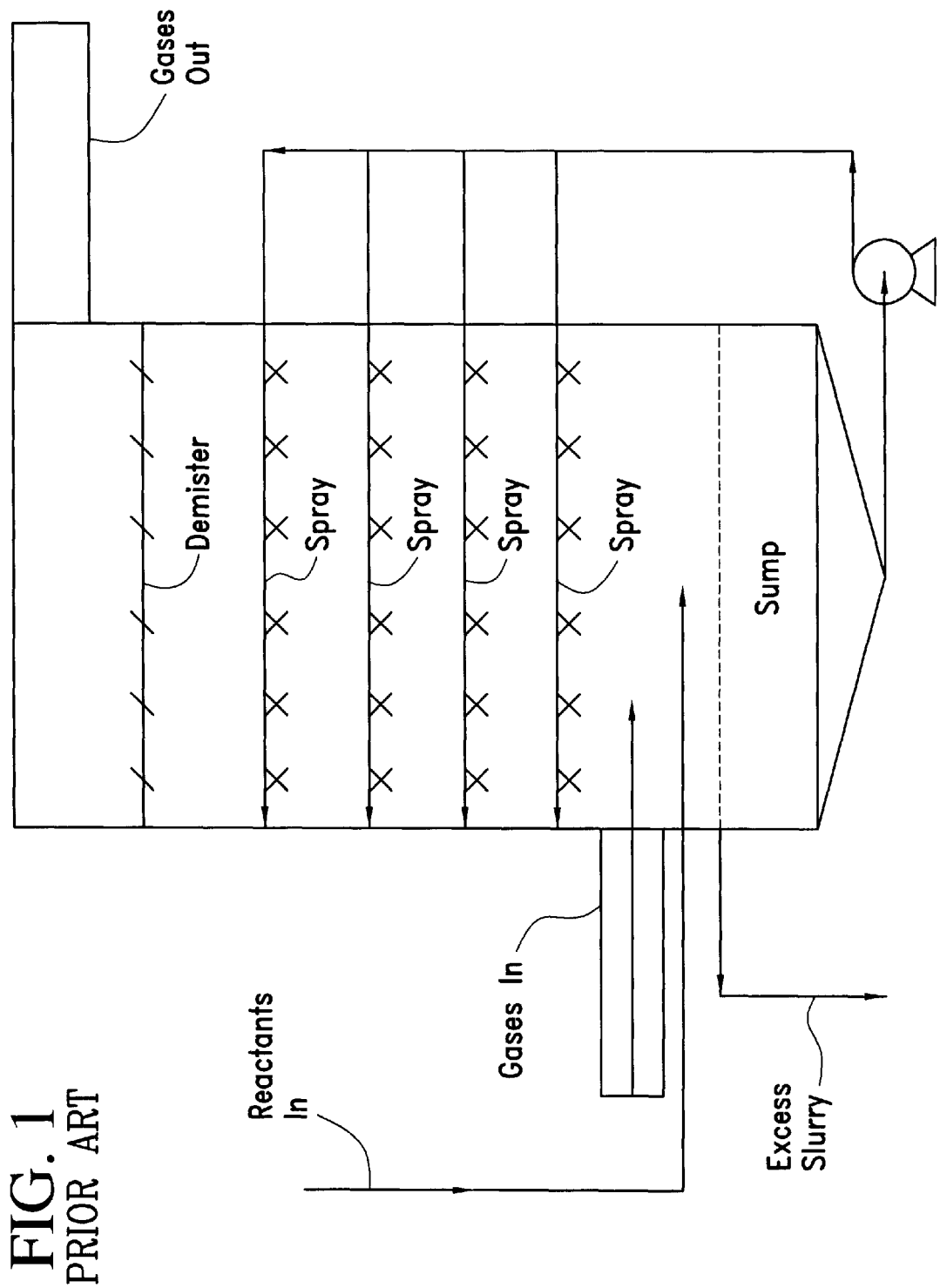
FIG. 1 represents a schematic illustration of a typical spray column scrubber.
Figure 2:
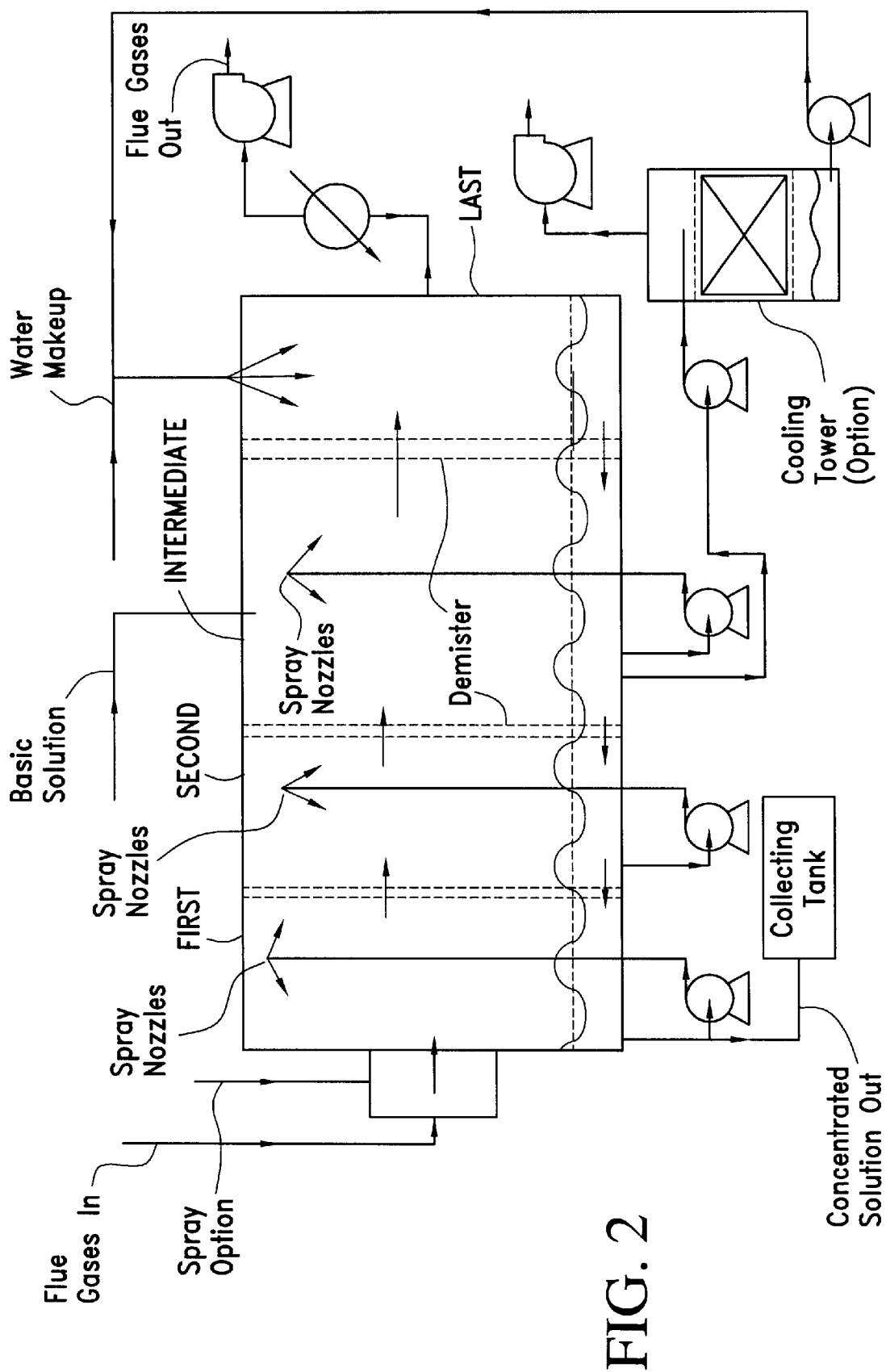
FIG. 2 represents a schematic illustration of the novel scrubber design.

If needed for layout constraints or convenience, the horizontal axis can be bent or turned in any direction or even arranged as a horizontal circular complete turn-around or horse-shoe. Such bending or turning of the novel scrubber of the invention has the horizontal axis for the compartments labeled "first," "second" and "intermediates" shown schematically in FIG. 2 with the compartments extending into or out of the paper as appropriate. Both novel scrubber designs whether having a straight, or bent or turned horizontal axis are shown schematically in FIG. 2.

At the bottom of each compartment, a liquid sump feeds a centrifugal pump (except possibly for the last one), which distributes the liquid to a series of spray nozzles creating 3–5 "falling curtains", perpendicular to the gas flow. In this way, the circulation rate in each compartment can be fixed independently from the others. The liquid drops are collected back into the sump, in the same compartment. The base reactant can be introduced in any one compartment, or divided between several compartments, or sprayed into the hot flue gases entering the system. Process water, or a process solution is introduced in the last compartment.

The number of compartments can be chosen as required for the particular process considered.

The gas flow is quenched and thermally equilibrated by water evaporation in the different compartments with liquids at different controlled concentrations, establishing a true multi-stages counter current process configuration. The liquid sumps of the different compartments are arranged so that excess liquid from one compartment overflows into the previous one, without possibility of liquid back-flow. Solutions of increasing concentrations are obtained in the overflows from the different compartments, and a concentrated solution obtained from the first compartment's sump overflows into a collecting tank (scrubber's liquid output).

If it is required to coot the exit gases to limit the plume-effect, it is possible to use water from an integrated cooling tower in the last compartment and recycle them to the cooling tower from any intermediate compartment.

Summing-up, the invention is based on a novel combination of the following features, which reduces significantly the deficiencies generally inherent in a spray column scrubber:

The separate compartments allow for a true multi-stages counter current process configuration with higher mass transfer driving forces, instead of a single stage in a spray column scrubber, due to the functional separation between the internal liquid recycle needed to adjust the liquid/gas volumetric flow-rates to a workable range, and the very small forwards net liquid flow needed to provide a concentrated solution for further processing.

This results into a smaller equipment volume required, and/or into a more concentrated bleed solutions for further solution, and/or into a lower residual concentration of objectionable impurities in the exit gases.

b) The horizontal configuration allows much higher gas velocities than in a spray column, since the gas is flowing perpendicularly to the drops gravity force, and the drops can only be moved sideways in a parabolic trajectory, until they impinge with the vertical "picket-fence" demisters. This results into much smaller cross section areas and "radial" dimensions and overall volume of the scrubber.

c) The novel configuration allows a flexible design and light-weight construction, at any convenient height, easily adaptable to industrial layouts without compromising on the functional performance, as it can be bent and installed on the roof or at roof level. The sumps needed are very shallow and could be slopped in any direction, as convenient.

d) The much lower pumping head needed, at least a factor of five, affects the energy cost. The pumps need not be expensive high pressure models.

While the invention will now be described in connection with certain preferred embodiments in the following Examples, it will be understood that it is not intended to limit the invention to these particular embodiments. On the contrary, it is intended to cover all alternatives, modifications and equivalents as may be included within the scope of the invention as defined in the appended a claims. Thus the following Examples which include preferred embodiments will serve to illustrate the practice of this invention, it being understood that the particulars described are by the way of example and for the purposes of illustrative discussion of the preferred embodiments of the present invention only and are presented to provide what is believed to be the most useful and readily understood description of the procedure as well as of the principles and conceptual aspects of the invention.

In the examples presented below, the percentages given are by weight unless otherwise stated.

EXAMPLE 1

A flow of 400,000 $Nm_3$/hour of flue gases at 100° C. containing 2,360 ppm (by volume) of $SO_2$ and 10% water (by volume) is introduced in a 5 compartments scrubber of the novel design described in this application. A stream of 9,500 kg/hour of a 15% ammonia solution is sprayed and evaporated in the inlet duct, cooling the gases to 64° C. Cooling water at 28° C. is added to the last compartment and the exit gases are cooled to 40° C. and contained less than 1% of the $SO_2$ in the feed and less than 10 ppm (by volume) ammonia. The water is removed from the second compartment and recycled to an integrated cooling tower, with the exception of a very small flow overflowing to the first compartment. 4,980 kg/hour of a 30% ammonium sulfite is obtained from the first compartment at 54° C.

EXAMPLE 2

750,000 $Nm_3$/hour of flue gases at 150° C. containing 745 ppm (by volume) of $SO_2$ and 10% water (by volume) are introduced in a 4-compartments scrubber of the novel design described in, this application. 5.650 kg/hour of a 15% ammonia solution are sprayed and evaporated in the inlet duct, cooling the gases to 139° C. In amount of 2,840 kg/hour of a 30% ammonium sulfite overflowed from the first compartment at 77° C. Cooling water at 28° C. is added to the last compartment and the exit gases are cooled to 40° C. and contained less than 3% of the $SO_2$ in the feed and less than 10 ppm (by volume) ammonia. The water is removed from the second compartment and recycled to an integrated cooling tower, with the exception of a very small flow overflowing to the first compartment.

EXAMPLE 3

An amount of 1,750,000 $Nm^3$/hour of flue gases at 150° C. containing 1,000 ppm (by volume) of $SO_2$ and 10% water (by volume) is introduced in a 6 compartments scrubber of the novel design described in this application. A 15% ammonia solution (17,700 kg/hour) is mixed with the inlet gases, cooling them to 135° C. The resulting solution overflowing from the first compartment at 72° C. consists of 4,980 kg/hour of 30% ammonium sulfite. Cooling water at 28° C. is added to the last compartment and the exit gases are cooled to 40° C. and contained less than 1.5% of the $SO_2$ in the feed and less than 10 ppm (by volume) ammonia. The water is removed from the second compartment and recycled to an integrated cooling tower, with the exception of a very small flow overflowing to the first compartment.

What is claimed is:

1. A novel scrubber equipment for treatment of flue gases from a power generation, metallurgical or chemical plant conducted process, in order to absorb acidic impurities from the flue gases into a liquid being a water-based solution, without substantial precipitation of a solid, said scrubber equipment comprising:

(a) a horizontal chamber having a basically rectangular cross section through which flue gases flow, said horizontal chamber divided along a horizontal axis into at least two compartments by a vertically-draining demister;

(b) a liquid-collecting sump disposed with each compartment;

(c) a pump disposed with each compartment to remove liquid from said sump disposed with said compartment to at least two spray nozzles disposed in said compartment to provide, "falling curtains" of the liquid that are perpendicular to the flue gas flow so the liquid drains back into the sump;

(d) the liquid sumps of the different compartments are arranged so that excess liquid from one compartment overflows into the previous one, without possibility of liquid back-flow, the liquid from the liquid sump of the first compartment overflows into a collecting tank, and water or a process solution is introduced in the last compartment so that solutions of increasing concentrations are obtained in the overflows from the different compartments and a concentrated final solution is obtained in the sump of the first compartment;

wherein the flue gases entering said horizontal chamber at one end and exiting at the other end are thoroughly washed by the liquid in said compartments with the liquid having different controlled concentrations of the water-based solution in different compartments.

2. The scrubber equipment as in claim 1, wherein the horizontal axis is not a straight line but is bent or tuned to fit the horizontal chamber within an available space.

3. The scrubber equipment as in claim 1, wherein each demister is formed by at least one "picket-fence" between the compartments to have the flue gas flow spread evenly across a cross section area that is vertical to the horizontal axis and to keep the amount of liquid moved by the flue gas flow between the compartments to a minimum.

4. The scrubber equipment as in claim 1, in which the number of compartments is between 3 and 7.

5. The scrubber equipment as in claim 1, wherein the flue gas flow rate through the horizontal chamber is between 3 and 12 meters/second.

6. The scrubber equipment as in claim 1, wherein cooling water from an integrated cooling tower circuit is introduced in a last compartment and recycled to be cooling water for any intermediate compartment.

7. The scrubber equipment as in claim 1, wherein a chemical reagent is introduced to the liquid in at least one of the compartments.

* * * * *